(12) United States Patent
Gilbert

(10) Patent No.: US 6,763,100 B2
(45) Date of Patent: *Jul. 13, 2004

(54) METHOD FOR PROVIDING ADDITIONAL INFORMATION TO A TELEPHONE CUSTOMER HAVING A NON-PUBLISHED TELEPHONE NUMBER

(75) Inventor: Lanny Gilbert, Atlanta, GA (US)

(73) Assignee: BellSouth Intellectual Property Corporation, Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/347,788

(22) Filed: Jan. 22, 2003

(65) Prior Publication Data

US 2003/0108169 A1 Jun. 12, 2003

Related U.S. Application Data

(62) Division of application No. 09/484,165, filed on Jan. 18, 2000.

(51) Int. Cl.⁷ .................................................. H04M 1/64
(52) U.S. Cl. ............................ 379/201.11; 379/210.03; 379/88.19; 379/210.01
(58) Field of Search ................ 379/88.16, 88.19–88.25, 379/201.01, 201.11, 210.01, 210.02, 210.03, 214.03, 218.01

(56) References Cited

U.S. PATENT DOCUMENTS

| | | |
|---|---|---|
| 4,924,496 A * | 5/1990 | Figa et al. ............. 379/142.06 |
| 4,959,855 A | 9/1990 | Daudelin |
| 5,058,152 A | 10/1991 | Solomon et al. |
| 5,163,083 A | 11/1992 | Dowden et al. |
| 5,204,894 A | 4/1993 | Darden |
| 5,329,578 A | 7/1994 | Brennan et al. |
| 5,339,352 A | 8/1994 | Armstrong et al. |
| 5,361,295 A | 11/1994 | Solomon et al. |
| 5,450,476 A | 9/1995 | D'Apuzzo et al. |
| 5,511,111 A | 4/1996 | Serbetcioglu et al. |
| 5,613,006 A | 3/1997 | Reese |
| 5,926,754 A | 7/1999 | Cirelli et al. |
| 5,991,369 A | 11/1999 | Petrunka et al. |
| 6,026,156 A | 2/2000 | Epler et al. |
| 6,111,940 A | 8/2000 | Kugell |
| 6,427,006 B1 | 7/2002 | Reding et al. |

* cited by examiner

Primary Examiner—Roland G. Foster
(74) Attorney, Agent, or Firm—Shaw Pittman LLP

(57) ABSTRACT

A method and system for notifying a non-published customer of a telephone network the number and possibly the identity of callers who have been attempting to obtain their non-published number from directory assistance. When a calling party calls for directory assistance, it is determined whether the telephone number sought is a non-published. If so, the call is forwarded to a service package application on a service node where at least a telephone number, and preferably also the name, of the calling party is obtained. A notification call is then placed to the non-published customer and the customer is provided with at least the telephone number and possibly the name of the calling party.

5 Claims, 3 Drawing Sheets

METHOD FOR PROVIDING ADDITIONAL INFORMATION TO A TELEPHONE CUSTOMER HAVING A NON-PUBLISHED TELEPHONE NUMBER

This application is a divisional application of U.S. Ser. No. 09/484,165, filed Jan. 18, 2000.

BACKGROUND

1. Field of the Invention

The present invention is directed to telephone network directory assistance services and more particularly to providing, to a telephone network user who has a non-published telephone number, information about who has attempted to obtain their telephone number via directory assistance.

2. Background of the Invention

Because of the desire for privacy, many telephone company customers choose not to have their telephone numbers published in a printed or on-line telephone directory. These customers also often request that their telephone numbers not be made available via a telephone network directory assistance service (often accessible in the United States by dialing 411) provided by the telephone company. Accordingly, such customers, generally known as "non-published customers," have prohibited the dissemination of their telephone numbers by the telephone networks, such that only the non-published customers can provide those telephone numbers.

While the privacy features of non-published numbers have certain advantages, non-published customers may be unwittingly missing important or desirable telephone calls. For example, a non-published customer might not receive desirable telemarketing calls, or personal calls from friends or relatives who do not know the non-published customer's telephone number. Thus, a non-published customer may fail to receive all of the telephone calls that he/she may actually want to receive.

SUMMARY OF THE INVENTION

The present invention provides an improvement to telephone networks and more specifically to the service provided to non-published customers of the telephone network. The present invention provides a method and system for providing information to a non-published customer about the caller who has requested directory assistance for the non-published number.

In accordance with a preferred embodiment of the present invention, when a caller dials directory assistance and asks for the telephone number of a non-published customer, the call is forwarded to a Service Node (SN) in the telephone network. The SN preferably has a Service Package Application (SPA) that answers the call and attempts to automatically gather the caller's telephone number and, if possible, the caller's name via a lookup table. The SPA then plays an announcement to the caller similar to a conventional announcement that is played when a telephone number is unavailable because it is non-published. In an alternative embodiment, particularly useful if the caller's telephone number cannot be easily obtained, the caller is asked to record his/her name and telephone number and the SPA stores this information for playback.

After the caller hangs up, and if the SPA was able to obtain at least the caller's telephone number, the SN places a notification call to the non-published customer and plays an announcement informing the non-published customer of the telephone number of the caller who had requested directory assistance. If the SPA was able also to identify the name of the caller, that information would also be read to the non-published customer using text-to-speech techniques. If the caller had recorded his/her identification information then that information is played back to the non-published customer. Thus, in accordance with the present invention, the non-published customer can learn who has been trying to contact him/her and decide whether to call the caller back.

Further in accordance with the present invention, the SN preferably asks the non-published customer whether to release their telephone number to the caller. If the non-published customer gives the proper authorization, the SN places a call to the caller's telephone number and provides the originally-requested information, namely the non-published customer's telephone number.

In yet another embodiment of the present invention, the SN itself gives the non-published customer the opportunity to immediately call the caller back, thereby eliminating the need for the non-published customer to hang up and place a new call, assuming the non-published customer desires to immediately contact the caller.

In still another embodiment of the present invention, the SN does not wait for the caller to hang up before calling the non-published subscriber, but instead notifies the caller that the number he/she is seeking is non-published and to hold while the non-published customer is called and a request is made of the non-published customer, based on the caller's telephone number (and possibly the caller's name as well), to release the non-published telephone number or immediately connect the call. This particular embodiment provides a valuable real-time telephone call screening method.

It is therefore an object of the present invention to provide a method of providing information to a non-published customer about a caller requesting the non-published customer's telephone number from directory assistance.

It is a further object of the present invention to provide, to a non-published customer, at least the telephone number and preferably also the name of the caller requesting directory assistance for the non-published customer's telephone number.

It is also an object of the present invention to give a non-published customer the opportunity to authorize the release of his/her telephone number to a caller who has called directory assistance.

It is another object of the present invention to provide a callback function to a caller attempting to obtain a telephone number of a non-published customer and provide the requested telephone number.

It still another object of the present invention to (i) automatically contact a non-published customer upon receiving a directory assistance request from a caller for the non-published customer's telephone number, (ii) provide the caller's telephone number, and preferably also the caller's name, to the non-published customer and (iii) obtain consent to set up a telephone connection between the caller and the non-published customer.

It is still a further object of the present invention to provide information to a non-published customer indicative of the number of times the non-published customer's telephone number has been requested from directory assistance.

These and other objects of the present invention will become apparent upon a reading of the detailed description below in conjunction with the accompanying drawings.

DETAILED DESCRIPTION OF THE INVENTION

Figure 1:
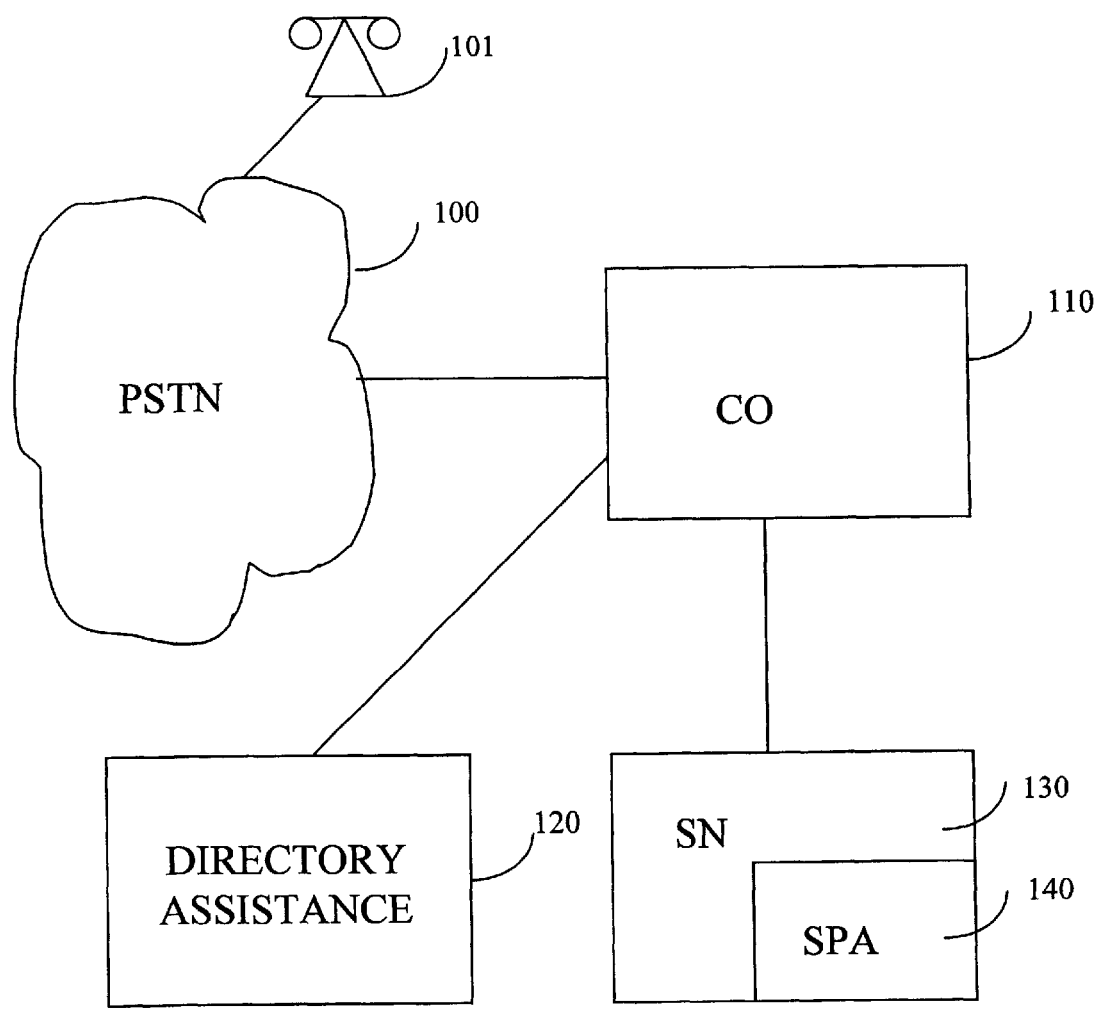
FIG. 1 is a schematic diagram illustrating a system for implementing the present invention.

FIG. 1 is a schematic diagram illustrating a telephone network system for implementing a preferred embodiment of the present invention. FIG. 1 shows a public switched telephone network (PSTN) 100 that is connected to a central office (CO) 110 of the telephone network. When a caller 101 calls for directory assistance over PSTN 100, e.g., by dialing 411, CO 110 connects the call to a directory assistance node 120 where operators are available to assist the caller.

In the case of a regularly listed telephone number, an operator at directory assistance node 120 provides the requested number to the caller. Where, for privacy reasons, a telephone customer has chosen to be a non-published customer, the caller is typically notified that the telephone number that is sought is non-published and the call is disconnected. However, in accordance with the present invention, when it is determined that the caller is seeking a non-published telephone number, the call is forwarded (either manually or via well-known call forwarding techniques) to a telephone number that points to service node (SN) 130 having deployed therein a Service Package Application (SPA) 140, which together provide the functionality of the present invention. While the use of a SN/SPA combination to implement the present invention is preferred, the present invention can be implemented using other apparatus that can provide the functionality described herein.

First Embodiment

Figure 2:
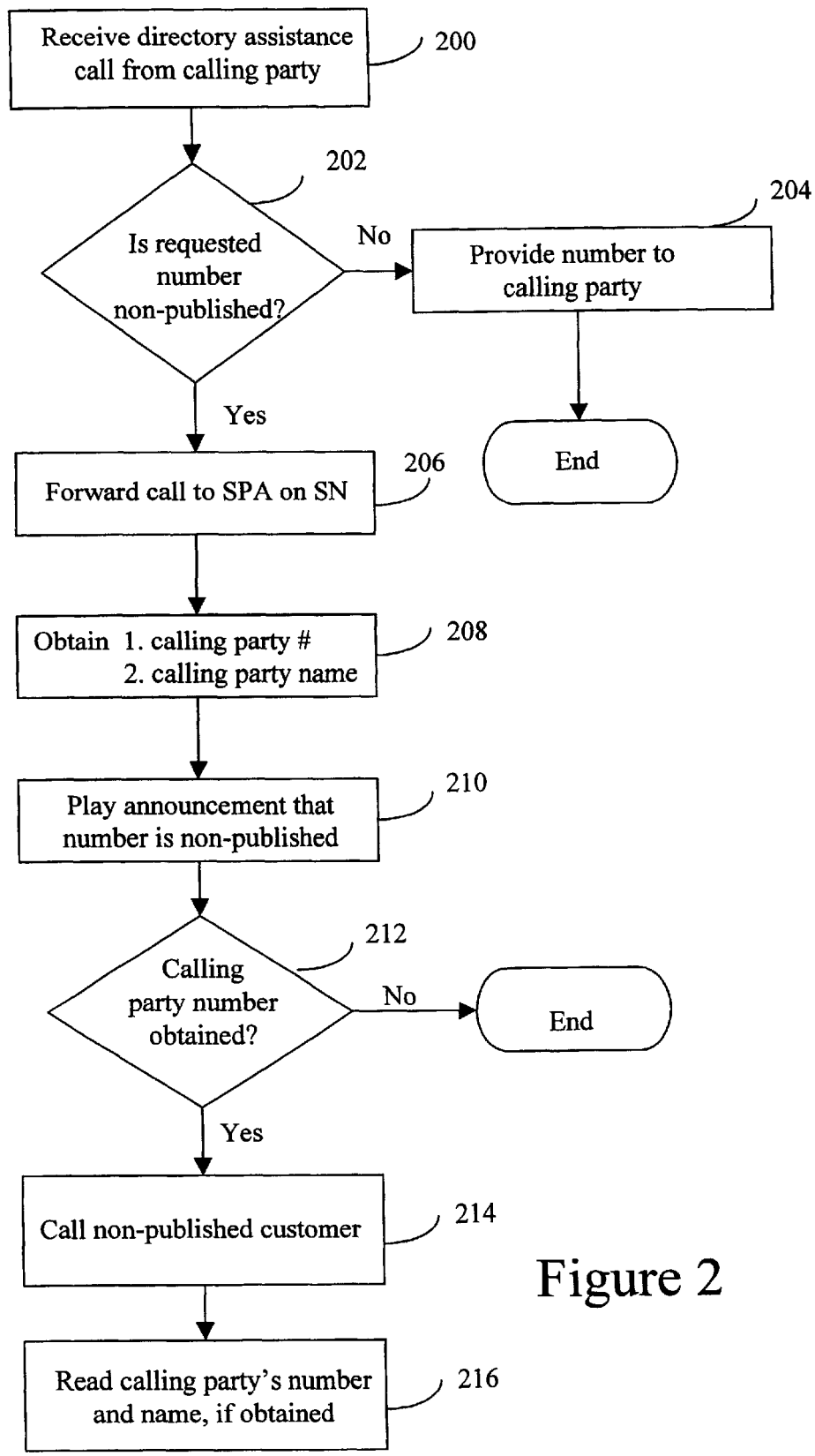
FIG. 2 is a flow chart of a first embodiment of the present invention.

FIG. 2 is a flow chart illustrating the functionality of a first embodiment of the present invention. At step 200, a call is received by directory assistance from a calling party. At step 202 it is determined whether the requested telephone number is non-published. If the requested telephone number is available to the public, then at step 204 the telephone number is provided to the calling party as is conventional. However, if the telephone number is non-published then, at step 206, the calling party's call is forwarded to SPA 140 on SN 130. SPA 140 preferably then attempts to obtain at least one and preferably two pieces of information, as shown in step 208. Specifically, SPA 140 first attempts to obtain the calling party's telephone number. This can be accomplished using well-known caller ID techniques. Of course, if the calling party has "blocked" the caller ID function on his telephone, then it may not be possible for SPA 140 to automatically obtain the calling party's telephone number. In an alternative implementation, SPA 140 requests that the caller record his/her name and telephone number. If a recording is a made then the process continues as described below.

Assuming the calling party's telephone number is obtained, then also at step 208, SPA 140 attempts to obtain the calling party's name via a lookup table (not shown), such as a reverse telephone book. Once the available information is obtained, then at step 210 an announcement is played notifying the calling party that the requested telephone number is non-published. The call is preferably disconnected at this point. However, the call may alternatively be disconnected immediately after obtaining the calling party's telephone number, since it is generally not necessary to keep the calling party connected while using the lookup table. Of course, announcement of step 212 is still played for the caller.

At step 212, it is determined whether the calling party's telephone number has been obtained. If not (for example, because the calling party's caller ID function was blocked or because the calling party number was unknown), the process ends. However, in an alternative embodiment (not shown) of the present invention, even if neither the calling party's telephone number nor name has been obtained, SPA 140 may nevertheless record that an attempt was made to obtain the non-published customer's telephone number. Information regarding how many times a request has been made of directory assistance for a telephone number may be valuable to a non-published customer. This information is preferably made available to the non-published customer via additional information on a monthly bill, via a special telephone number accessible only to the non-published customer, via voice mail for customers who have a voice mail account on the telephone network or via an automatic callback method, similar to that described below.

If at least the calling party's telephone number has been obtained then, at step 214, SN 130 places a notification telephone call to the non-published customer. Preferably the notification call is attempted immediately after it is determined that at least the calling party's telephone number was obtained. However, the notification call could be delayed if desired. For instance, the calling party may have attempted to obtain the non-published customer's telephone number late at night. Accordingly, under such circumstances, it is desirable to delay placing the notification call to the non-published customer until a more convenient hour.

At step 216, when the non-published customer answers the telephone, an announcement is played indicating that a request for the non-published customer's telephone number has recently been made via directory assistance. Then, the calling party's telephone number is announced by recorded human voice or digital-to-analog techniques. If the name of the calling party was also obtained, then the name is also announced to the non-published customer, using text-to-speech techniques which are known by those skilled in the art. In the alternative embodiment described above, the number of times the non-published telephone number has been requested may also be announced at this time. Optionally, a notification call could be made just to notify the non-published customer of the number of times a request for his/her telephone number has been made.

Thus, in accordance with the present invention, non-published customers of the telephone company are automatically provided information about callers who are trying to reach them via directory assistance. Without the method and system of the present invention, non-published customers are unaware of who is attempting to obtain their telephone number and/or unable to determine how often their telephone number has been requested.

Second Embodiment

A second embodiment of the present invention adds further functionality to the first embodiment described above. In the second embodiment, after the calling party's telephone number (and preferably also name) have been read to the non-published customer, SPA 140 asks, via a prerecorded announcement or other audio technique, for authorization to release the non-published telephone number to the calling party. Authorization can be provided by pressing the "#" key, for example, on the telephone keypad. If no authorization is given, nothing further occurs.

However, if authorization is given to release the non-published telephone number, then SN 130 automatically places a telephone call to the calling party and announces that the non-published customer has authorized release of his or her number. SPA 140 then reads the telephone number to the calling party. The calling party may then place his or her own call back to the non-published customer.

Third Embodiment

In an alternative, or even cumulative, embodiment to the second embodiment described above, the third embodiment of the present invention provides automatic call set up between the non-published customer and the calling party. Specifically, after the telephone number and preferably the name of the calling party have been provided to the non-published customer, the non-published customer is asked by SPA 140 (via a pre-recorded announcement or the like) whether he/she would like to call the calling party. An affirmative response can be provided by, for example, pressing the "*" key on the telephone set. If the answer is affirmative, then SPA 140 places a call to the calling party and, once the calling party's telephone begins to ring, connects the non-published customer to this call and removes itself from the circuit. Specifically, SPA 140 places a call to the calling party using what is commonly known as a "blind transfer." That is, as soon as the SN 130 detects ringing supervision, the call is transferred from SN 130 to the appropriate CO. Both the incoming and outgoing ports on SN 130 are freed at this point.

This third embodiment provides the significant advantage that the non-published customer still need not divulge his/her telephone number to the calling party. And as long as the non-published customer has blocked the caller ID function on his/her telephone, the original calling party will still not learn the non-published customer's telephone number.

Fourth Embodiment

Figure 3:
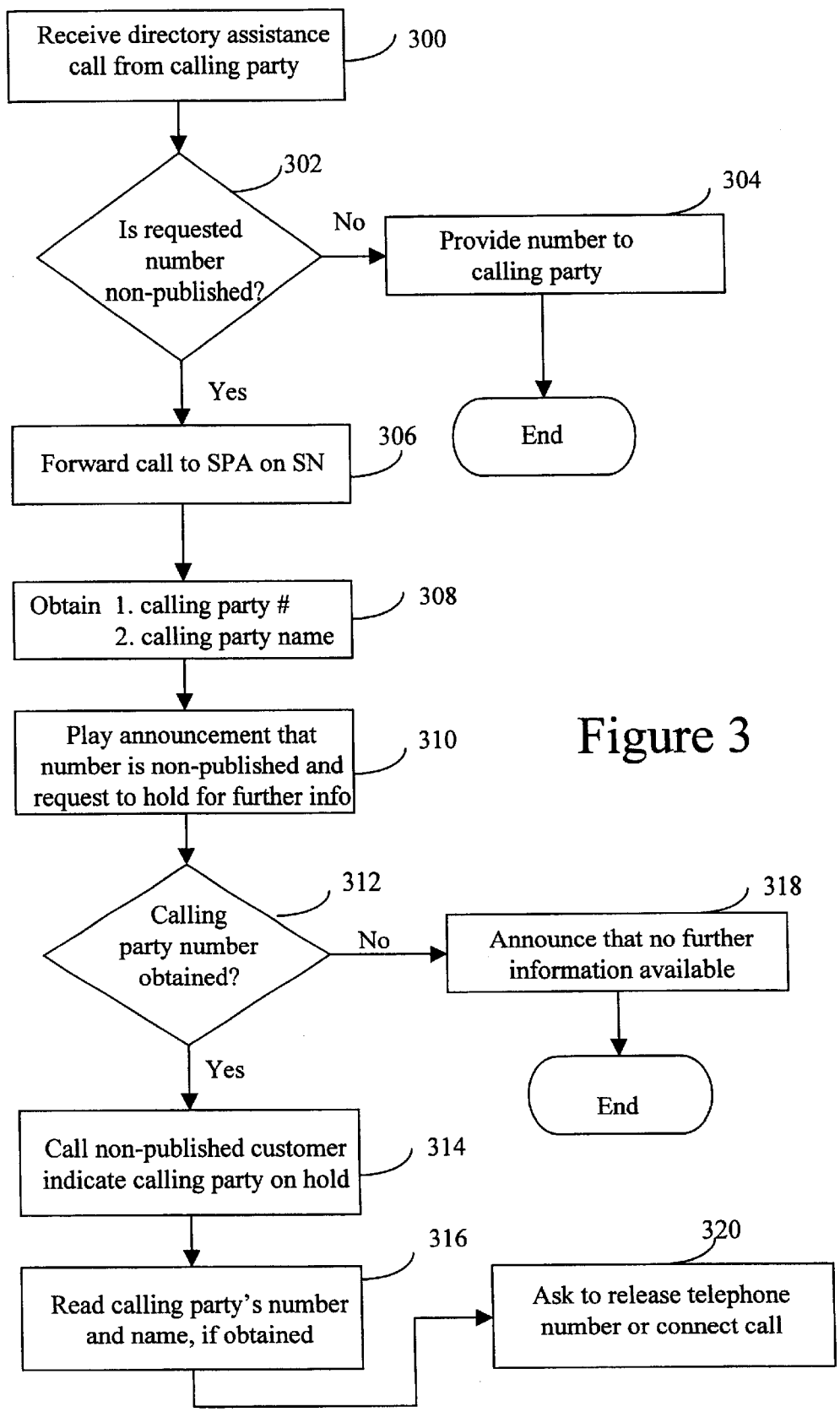
FIG. 3 is a flow chart of a fourth embodiment of the present invention.

In a fourth embodiment of the present invention, instead of SPA 140 disconnecting the calling party after announcing that the telephone number sought is non-published as described in the first embodiment, the calling party is given an announcement that the telephone number being sought is non-published, but to "hold" while the non-published customer is contacted. The fourth embodiment of the present invention is shown schematically in the flow chart of FIG. 3. Steps 300–308 are identical to steps 200–208 of the first embodiment and thus need not be described again.

At step 310 in the present embodiment, the calling party is told that the number requested is non-published, but to hold for possible further information. If at step 312 no calling party information was obtained, then at step 318 it is announced that no further information is available. This step might be invoked if the calling party had blocked caller ID thereby precluding SPA 140 from learning the identity of the calling party.

If, on the other hand, calling party information was obtained at step 308, i.e., the caller is identified, a call is placed to the non-published customer notifying the customer that a request for the customer's number has been made, and that the calling party is now on hold. The calling party's information is then read to the non-published customer at step 316 and then, at step 320, SPA 140 asks the non-published customer whether his/her number should be released or whether he/she would like the call connected. The non-published customer preferably indicates his/her choice using predetermined keys on his/her telephone set. If the non-published customer chooses to have the telephone number released, SPA 140 preferably disconnects the non-published customer, notifies the calling party of the non-published telephone number, and then disconnects the call. If the non-published customer chooses to have the call connected then SPA 140 connects the non-published customer with the calling party who is on hold. Specifically, SN 130, when receiving the calling party's incoming call, attaches a voice port to that call. This way, he calling party can hear the announcements being played by SPA 140 on SN 130. When the outgoing call is made to the non-published customer, a different voice port is used for playing announcements to the non-published customer. If the non-published customer chooses to connect with the calling party, SPA 140 joins the incoming line with the outgoing line. This allows the caller and the non-publihsed customer to communicate with each other. Spa 140 can, at this point, remove the voice ports since no further announcements are to be played. The call will be held on SN 130 until one of the parties hangs up, at which point the incoming and outgoing lines on SN 130 are freed. Of course, as explained above, the call from SPA 140 to the non-published customer can be delayed to avoid telephone calls at inappropriate times.

Further, with each of the embodiments of the present invention described herein, the non-published customer preferably controls, via a soft key on his/her telephone set, for example, whether the functionality described herein is to be enabled. That is, the non-published customer may not want to be disturbed at all for certain periods of time and may accordingly disable the notification call function for those periods.

Thus, the present invention offers an important service to a non-published customer. Specifically, a non-published customer, in accordance with the present invention, is able to learn who has been trying to contact them via directory assistance. Further, the present invention provides additional functionality wherein the telephone company or other service provider automatically provides the requested telephone number to a calling party only after receiving authorization to do so. Further still, if desired, the non-published customer can be connected to the calling party either in real time, while the calling party is waiting on the line, or at a later time. Accordingly, the present invention provides an assortment of improved features for non-published customers of a telephone network.

Although described with respect to a traditional telephone network, the present invention is equally applicable to internet telephony systems or other communications systems where an address, telephone number or other data might be non-published, or generally unavailable to the public at large.

Also, although the preferred embodiments described herein indicate that the information obtained, i.e., the calling party telephone number and name, is announced or read to the non-published customer, this information may also be provided electronically and viewed, for example, on a monitor or on a telephone display. Under such circumstances, the "notification call" of the present invention is an electronic transfer of data from the telephone company or other service provider to a non-published customer data terminal, either a computer or telephone display such as the displays used for caller ID. Thus, the non-published can see, rather than hear the gathered information.

The foregoing disclosure of embodiments of the present invention and specific examples illustrating the present invention has been presented for purposes of illustration and description. It is not intended to be exhaustive or to limit the invention to the precise forms disclosed. Many variations and modifications of the embodiments described herein will be obvious to one of ordinary skill in the art in light of the above disclosure. The scope of the invention is to be defined only by the claims appended hereto, and by their equivalents.

What is claimed is:

1. A method for providing information to establish a telephone connection between a non-published customer and a calling party, comprising the steps of:
   (a) receiving a directory assistance request from the calling party for a non-published telephone number associated with the non-published customer;
   (b) determining a telephone number associated with the calling party;
   (c) informing the non-published customer of the calling party's telephone number; and
   (d) placing a call to the calling party to inform the calling party of the telephone number associated with the non-published customer, wherein the call is placed only after receiving authorization from the non-published customer.

2. The method of claim 1, further comprising determining a name of the calling party and informing the non-published customer of the name.

3. The method of claim 1, further comprising announcing to the calling party that the directory assistance request is for a non-published telephone number.

4. The method of claim 1, further comprising delaying the step of informing the non-published customer of the calling party's telephone number.

5. The method of claim 1, further comprising placing a call to the non-published customer to perform step (c).

* * * * *